US012684286B2

(12) United States Patent
Wang et al.

(10) Patent No.: US 12,684,286 B2
(45) Date of Patent: Jul. 14, 2026

(54) ACOUSTIC OUTPUT APPARATUS, EARPHONE AND ULTRA-LINEAR MULTI-MAGNETIC DOUBLE-DIAPHRAGM LOUDSPEAKER

(71) Applicant: Shenzhen Dancing Future Technology Ltd., Shenzhen (CN)

(72) Inventors: Chuanbo Wang, Shenzhen (CN); Hongguo Deng, Shenzhen (CN); Qifeng Chen, Shenzhen (CN)

(73) Assignee: Shenzhen Dancing Future Technology Ltd, Shenzhen (CN)

( * ) Notice: Subject to any disclaimer, the term of this patent is extended or adjusted under 35 U.S.C. 154(b) by 152 days.

(21) Appl. No.: 18/807,832

(22) Filed: Aug. 16, 2024

(65) Prior Publication Data

US 2024/0406616 A1 Dec. 5, 2024

Related U.S. Application Data

(63) Continuation of application No. PCT/CN2023/135507, filed on Nov. 30, 2023.

(30) Foreign Application Priority Data

Feb. 10, 2023 (CN) ......................... 202310145578.5
Feb. 10, 2023 (CN) ......................... 202320184066.5
Oct. 10, 2023 (CN) ......................... 202322717683.X

(51) Int. Cl.
*H04R 1/28* (2006.01)
*H04R 1/10* (2026.01)
(Continued)

(52) U.S. Cl.
CPC ......... *H04R 1/2834* (2013.01); *H04R 1/1075* (2013.01); *H04R 7/06* (2013.01); *H04R 9/025* (2013.01)

(58) Field of Classification Search
CPC .. H04R 1/1016; H04R 1/2834; H04R 1/1075; H04R 1/2819; H04R 7/06; H04R 9/025
(Continued)

(56) References Cited

U.S. PATENT DOCUMENTS

2014/0334656 A1* 11/2014 Lu ............................ H04R 1/10
381/370
2020/0107112 A1 4/2020 Lu et al.

FOREIGN PATENT DOCUMENTS

CN 204046793 U 12/2014
CN 205051866 U 2/2016
(Continued)

OTHER PUBLICATIONS

International Search Report and Written Opinion for PCT/CN2023/135507, mailed Mar. 1, 2024, 16 pages.
(Continued)

*Primary Examiner* — Paul Kim
(74) *Attorney, Agent, or Firm* — Astute IP Law Group

(57) ABSTRACT

An acoustic output apparatus and an earphone, including: a first diaphragm, a driving component, a second diaphragm and a housing structure, where a space between the second and first diaphragms close to the driving component forms a first cavity with the housing structure; a space between the electroacoustic transducer and the second diaphragm forms a second cavity with the housing structure; and in a working state, the driving component drives the first diaphragm to vibrate so as to cause the second diaphragm to passively vibrate, and a volume of the second cavity is not greater than ⅕ of an equivalent volume of the electroacoustic transducer.

15 Claims, 9 Drawing Sheets

(51) Int. Cl.
*H04R 7/06* (2006.01)
*H04R 9/02* (2006.01)

(58) Field of Classification Search
USPC .......................................................... 381/186
See application file for complete search history.

(56) References Cited

FOREIGN PATENT DOCUMENTS

| | | | |
|---|---|---|---|
| CN | 110049413 | A | 7/2019 |
| CN | 217363282 | U | 9/2022 |
| CN | 115175072 | A | 10/2022 |
| CN | 218301631 | U | 1/2023 |
| CN | 218450514 | U | 2/2023 |
| CN | 218941327 | U | 4/2023 |
| CN | 116055967 | A | 5/2023 |
| CN | 221728472 | U | 9/2024 |
| JP | H01-101794 | A | 4/1989 |
| JP | 2014-220782 | A | 11/2014 |
| TW | 508001 | U | 10/2002 |

OTHER PUBLICATIONS

Notice of Allowance for Chinese Patent Application No. 202320184066.5, mailed Mar. 29, 2023, 2 pages.
Office Action received for Japanese Patent Application No. 2024-547262, mailed on Aug. 5, 2025, 8 pages (4 pages of English Translation and 4 pages of Original Document).
Office Action received for Chinese Patent Application No. 202310145578.5, mailed on Dec. 19, 2025, 17 pages (8 pages of English Translation and 9 pages of Original Document).

* cited by examiner

ACOUSTIC OUTPUT APPARATUS, EARPHONE AND ULTRA-LINEAR MULTI-MAGNETIC DOUBLE-DIAPHRAGM LOUDSPEAKER

CROSS-REFERENCE TO RELATED APPLICATIONS

The present application is a continuation of International Application No. PCT/CN2023/135507, filed on Nov. 30, 2023 and entitled "ACOUSTIC OUTPUT DEVICE, EARPHONE, AND SUPER-LINEAR MULTI-MAGNETIC DUAL-DIAPHRAGM SPEAKER", which claims the priority to the Chinese utility model patent with Patent Application No. 202322717683.X filed on Oct. 10, 2023 and entitled "ACOUSTIC OUTPUT APPARATUS AND EARPHONE", the Chinese invention patent with Patent Application No. 202310145578.5 filed on Feb. 10, 2023 and entitled "ULTRA-LINEAR MULTI-MAGNETIC DOUBLE-DIAPHRAGM LOUDSPEAKER", and the Chinese utility model patent with Patent Application No. 202320184066.5 filed on Feb. 10, 2023 and entitled "ULTRA-LINEAR MULTI-MAGNETIC DOUBLE-DIAPHRAGM LOUDSPEAKER". All of the aforementioned applications are hereby incorporated by reference in their entireties.

TECHNICAL FIELD

The present application relates to the technical field of sound generation devices, and in particular, to an acoustic output apparatus, an earphone and an ultra-linear multi-magnetic double-diaphragm loudspeaker.

BACKGROUND

With the development of the society, the application of acoustic output apparatuses such as earphones is becoming more and more widespread, and people's requirements for the sound quality and wearing comfort of the earphones are also increasing.

Open-type earphones in the related art have superior wearing comfort performance as the earphones do not extend into human ear canal.

SUMMARY

A main object of the present application is to provide an acoustic output apparatus, an earphone and an ultra-linear multi-magnetic double-diaphragm loudspeaker, aiming to improve a bass performance of the acoustic output apparatus and the earphone, and to ensure linearity of frequency response of the ultra-linear multi-magnetic double-diaphragm loudspeaker.

In order to achieve the above object, in a first aspect, the present application provides an acoustic output apparatus, including:

- an electroacoustic transducer including a first diaphragm and a driving component, where the first diaphragm is provided on a side of the driving component and is connected to the driving component;
- a second diaphragm provided at a side of the driving component away from the first diaphragm, the second diaphragm being spaced apart from the electroacoustic transducer; and
- a housing structure configured to carry the electroacoustic transducer and the second diaphragm, where a space between a side of the second diaphragm close to the driving component and a side of the first diaphragm close to the driving component forms a first cavity with the housing structure, and a space between a side of the electroacoustic transducer close to the second diaphragm and the second diaphragm forms a second cavity with the housing structure; where,
- in a working state, the driving component drives the first diaphragm to vibrate, the first diaphragm pushes an air spring sealed in the first cavity to vibrate and causes the second diaphragm to passively vibrate with the air spring, and a volume of the second cavity is not greater than ⅕ of an equivalent volume of the electroacoustic transducer.

In a second aspect, the present application further provides an earphone, including an acoustic output apparatus, where the acoustic output apparatus includes:

- an electroacoustic transducer including a first diaphragm and a driving component, where the first diaphragm is provided on one side of the driving component and is connected to the driving component;
- a second diaphragm provided on one side of the driving component away from the first diaphragm, the second diaphragm being spaced apart from the electroacoustic transducer; and
- a housing structure configured to carry the electroacoustic transducer and the second diaphragm, where a space between a side of the second diaphragm close to the driving component and a side of the first diaphragm close to the driving component forms a first cavity with the housing structure, and a space between a side of the electroacoustic transducer close to the second diaphragm and the second diaphragm forms a second cavity with the housing structure; where,
- in a working state, the driving component drives the first diaphragm to vibrate, the first diaphragm pushes an air spring sealed in the first cavity to vibrate and causes the second diaphragm to passively vibrate with the air spring, and a volume of the second cavity is not greater than ⅕ of an equivalent volume of the electroacoustic transducer.

According to a third aspect, the present application provides an ultra-linear multi-magnetic double-diaphragm loudspeaker, including a support, where a second copper ring is provided inside the support, a first copper ring is provided on an upper surface of the support, a composite diaphragm is provided on one side of the first copper ring and a composite membrane is provided inside the support.

DESCRIPTION OF REFERENCE NUMERALS

10. earphone; 100. acoustic output apparatus; 200. functional structure; 300. ear hook structure; 400. transition structure; 110. electroacoustic transducer; 120. second diaphragm; 130. housing structure; 150. protective structure; 111. first diaphragm; 112. driving component; 121. diaphragm body; 122. flat central sticker; 123. first through hole; 124. second through hole; 131. first sound output hole; 132. second sound output hole; 133. protrusion structure; 134. first surface; 135. first end face; 136. first face; 137. second face; 138. third face; 139. first curved face; 140. fourth face; 141. fifth face; 142. sixth face; 143. second curved face; 1121. mounting frame; 1122. magnetic circuit assembly; 1123. voice coil; 1211. middle flat portion; 1212. folded ring portion; 101. first cavity; 102. second cavity; 103. third cavity; 104. fourth cavity;

1. first pin; 2. second pin; 3. first folded ring; 4. magnetic conduction plate; 5. magnet; 6. first washer; 7. composite diaphragm; 8. first copper ring; 9. first FPC (first flexible printed circuit); 19. second folded ring; 11. composite membrane; 12. voice coil; 13. second FPC (second flexible printed circuit); 14. second copper ring; 15: support; 16: second washer; 17: first side magnet; 18: second side magnet.

DESCRIPTION OF EMBODIMENTS

To make the purposes, technical solutions, and advantages of the present application clearer, the following is a further detailed explanation of this application with reference to the accompanying drawings and specific embodiments.

The following will provide a clear and complete description of the technical solutions in the embodiments of the present application with reference to FIG. 1 to FIG. 13. Obviously, the embodiments described are only some rather than all of embodiments of the present application. All other embodiments obtained by those skilled in the art based on the embodiments of the present application without creative effort shall fall within the protection scope of the present application.

The embodiments of the present application provide an acoustic output apparatus and an earphone, and the earphone may include the acoustic output apparatus. When the acoustic output apparatus or the earphone is worn an ear of a human body, the acoustic output apparatus and the earphone may transmit an acoustic signal to the ear. The acoustic output apparatus and the earphone provided in the embodiments of the present application have excellent bass performance, and can solve the problem of insufficient bass of an earphone in the related art. This will be described thereinafter with reference to the accompanying drawings.

Figure 1:
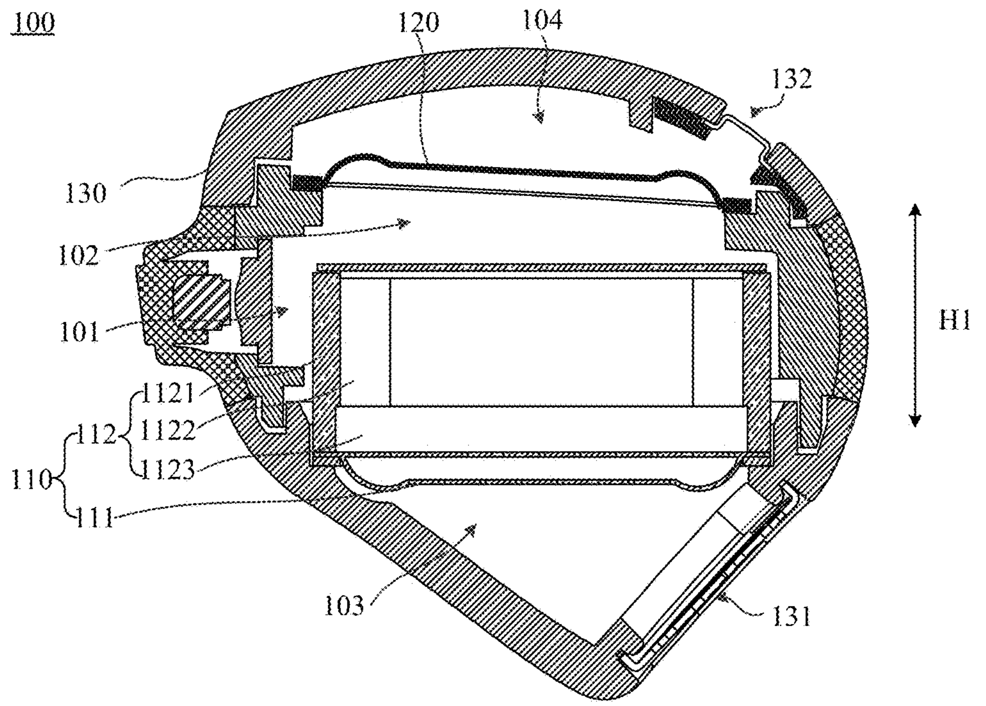
FIG. 1 is a schematic diagram of a first structure of an acoustic output apparatus provided in an embodiment of the present application.

Referring to FIG. 1, FIG. 1 is a schematic diagram of a first structure of an acoustic output apparatus 100 provided in an embodiment of the present application. The acoustic output apparatus 100 includes an electroacoustic transducer 110, a second diaphragm 120 and a housing structure 130.

The electroacoustic transducer 110 includes a first diaphragm 111 and a driving component 112, where the first diaphragm 111 is provided on a first side of the driving component 112 and is connected to the driving component 112. The second diaphragm 120 is provided on a second side of the driving component 112 opposite to the first side, and the second diaphragm 120 may be located on a side of the driving component 112 away from the first diaphragm 111, so that the first diaphragm 111, the driving component 112 and the second diaphragm 120 are stacked in a direction H1 (a thickness direction of the acoustic output apparatus 100) from the first side to the second side. Where the second diaphragm 120 is spaced apart from the electroacoustic transducer 110, and there is no physical connection relationship between the second diaphragm 120 and the electroacoustic transducer 110. The housing structure 130 is configured to carry the electroacoustic transducer 110 and the second diaphragm 120, and a space between a side of the second diaphragm 120 close to the driving component 112 and a side of the first diaphragm 111 close to the driving component 112 forms a first cavity 101 with the housing structure 130, and the first cavity 101 may be limited by the first diaphragm 111, the second diaphragm 120 and the housing structure 130 so as to form a sealed cavity. Air sealed inside the first cavity 101 may form (or be similar to) an air spring under a vibration force. When the acoustic output apparatus 100 is in a working state, the driving component 112 may drive the first diaphragm 111 to vibrate, and the first diaphragm 111 may push the air spring sealed inside the first cavity 101 to vibrate and cause the second diaphragm 120 to passively vibrate with the air spring. Where a space between a side of the electroacoustic transducer 110 close to the second diaphragm 120 and the second diaphragm 120 forms a second cavity 102 with the housing structure 130, and the second cavity 102 may be a sub-cavity of the first cavity 101, and a volume of the second cavity 102 is not greater than (less than or equal to) ⅕ of an equivalent volume of the electroacoustic transducer 110.

It should be understood that, the equivalent volume of the acoustic output apparatus 100 means that after the acoustic output apparatus 100 is placed into a box with a certain internal volume, if an acoustic compliance of the air in the box is exactly equal to that of the acoustic output apparatus 100, then the internal volume of the box is the equivalent volume of the acoustic output apparatus 100. Where the acoustic compliance can be converted into a force compliance or an equivalent compliance, by an area of a diaphragm of the electroacoustic transducer 110, i.e., the first diaphragm 111 in the present application, and the force compliance can represent a looseness of a suspension system of a sound generation apparatus, such as the acoustic output apparatus 100, or a compliance of a displacement after being subjected to a force. The force compliance=the acoustic compliance/$S^2$, where S is the area of the first diaphragm 111 of the electroacoustic transducer 110. In an acoustic output apparatus 100 or a sound generation apparatus with high compliance, the diaphragm has a large displacement after being subjected to the force, and a low resonance frequency in the case of the same diaphragm mass, and a unit of the compliance is meter per Newton (m/N).

The first diaphragm 111 in the embodiment of the present application is connected to the driving component 112 and receives a driving force of the driving component 112, and the second diaphragm 120 is spaced from the driving component 112 and passively vibrates under the action of the air spring, so that the first diaphragm 111, the driving component 112, the air spring and the second diaphragm 120 in the present application can form a double-diaphragm vibration system. Under the action of the vibration of the two diaphragms, the acoustic output apparatus 100 in the present application can transmit a sound signal to exterior of the acoustic output apparatus 100 from a side of the first diaphragm 111 away from the driving component 112 and a side of the second diaphragm 120 away from the driving component 112. At this time, a low-frequency resonance frequency of the acoustic output apparatus 100 is influenced by a mass and compliance of the air spring and a mass and compliance of the second diaphragm 120.

When a volume of the second cavity 102, which is formed by the second diaphragm 120, a side of the electroacoustic transducer 110 close to the second diaphragm 120, and the housing structure 130, is not greater than ⅕ of an equivalent volume of the electroacoustic transducer 110, the volume of the second cavity 102 is relatively small, the compliance of the air spring is relatively small, and then the elasticity of the air spring is relatively large, so that an energy of the first diaphragm 111 can be more transferred to the second diaphragm 120, and the second diaphragm 120 may provide a lower low-frequency resonance frequency for the acoustic output apparatus 100, and the acoustic output apparatus 100 may provide a low-frequency signal with a wider frequency spectrum. In this way, the acoustic output apparatus 100 has excellent bass performance.

In some embodiments, the volume of the second cavity 102 may be further not greater than ⅙, ⅛, ⅒, 1/15, etc. of the equivalent volume of the electroacoustic transducer 110. At this time, the volume of the second cavity 102 is smaller, the frequency spectrum of the low-frequency signal outputted by the acoustic output apparatus 100 is wider, and the bass performance of the acoustic output apparatus 100 is better. The embodiment of the present application does not specifically limit the volume of the second cavity 102.

In some embodiments, the driving component 112 includes a mounting frame 1121, a magnetic circuit assembly 1122 and a voice coil 1123, where the magnetic circuit assembly 1122 may be provided on the mounting frame 1121, and the voice coil 1123 can cut magnetic induction lines of the magnetic circuit assembly 1122. The first diaphragm 111 is fixedly connected to the voice coil 1123, and the first diaphragm 111 can, for example, but is not limited to, be bonded to the voice coil 1123 through an adhesive. When an electrical signal passes through the voice coil 1123, the voice coil 1123 interacts with the magnetic circuit assembly 1122 and drives the first diaphragm 111 to vibrate, and then the first diaphragm 111 may push the air spring of the first cavity 101 to vibrate and cause the second diaphragm 120 to passively vibrate with the air spring, the first diaphragm 111 may be an active diaphragm of the acoustic output apparatus 100, and the second diaphragm 120 may be a passive diaphragm of the acoustic output apparatus 100.

In some embodiments, the second diaphragm 120 may be fixedly connected to the housing structure 130 and spaced apart from the driving component 112, and the second diaphragm 120 may, for example, but is not limited to, be bonded and fixed to the housing structure 130 through an adhesive. There is a gap between the second diaphragm 120 and a side of the driving component 112 away from the first diaphragm 111, so that the second diaphragm 120 is a passive diaphragm of the acoustic output apparatus 100.

In the acoustic output apparatus 100 of the embodiment of the present application, under the action of the electroacoustic transducer 110, the second diaphragm 120 and the housing structure 130, the first diaphragm 111, the driving component 112, the air spring in the first cavity 101, and the second diaphragm 120 may form a double-diaphragm vibration sound generation system. Under the vibration of the two diaphragms, the acoustic output apparatus 100 has a small attenuation under a low-frequency sound signal, and the acoustic output apparatus 100 has an excellent low-frequency performance. Furthermore, when the volume of the second cavity 102, which is formed by the second diaphragm 120, the side of the electroacoustic transducer 110 close to the second diaphragm 120 and the housing structure 130, is not greater than ⅕ of the equivalent volume of the electroacoustic transducer 110, the volume of the second cavity 102 is relatively small, and the energy of the first diaphragm 111 can be more transferred to the second diaphragm 120, and since the second diaphragm 120 has a certain area (the area of the second diaphragm 120 in the present application is much larger than a cross-sectional area of a sound guide tube in a sound guide solution using the sound guide tube in the related art), the second diaphragm 120 has a lower vibration amplitude, and may provide a lower low-frequency resonance frequency for the acoustic output apparatus 100, and the acoustic output apparatus 100 may provide a low-frequency signal having a wider frequency spectrum, so that the acoustic output apparatus 100 may have better bass performance. Furthermore, since the first cavity 101 is a sealed space, compared with the solution using the sound guide tube, the acoustic output apparatus 100 in the present application does not have a frictional sound caused by compressing the air, which can further improve the sound quality of the acoustic output apparatus 100. Furthermore, compared with a solution of providing two sets of independent electroacoustic transducers 110 in the related art, the second diaphragm 120 in the present application is a passive diaphragm and occupies a smaller space, so that the acoustic output apparatus 100 and the earphone 10 in the present application can realize a miniaturized design, and the earphone 10 is smaller and easier to wear.

In some embodiments, a projection portion where a first orthographic projection of the electroacoustic transducer 110 on a first reference plane parallel to the first diaphragm 111 overlaps with a second orthographic projection of the second diaphragm 120 on the first reference plane has a first area. Among the first and second orthographic projections, the one with the larger area has a second area, and a ratio of the first area to the second area may be 0.7-1 (the ratio may be equal to 0.7 or 1; and numerical ranges in the present application all include end values unless otherwise specified, which will not be repeated hereinafter), and the ratio of the first area to the second area may be greater than or equal to 0.7 and less than or equal to 1. Where, the ratio of the first area to the second area may be 0.8-1, or the ratio may be 0.9-1. Based on a volume formula, when the ratio of the first area to the second area is between 0.7 and 1, the second cavity 102, which is formed by the space between the second diaphragm 120 and the side of the driving component 112 away from the first diaphragm 111 together with the housing structure 130, has a small volume, and the acoustic output apparatus 100 has excellent bass performance.

Figure 2:
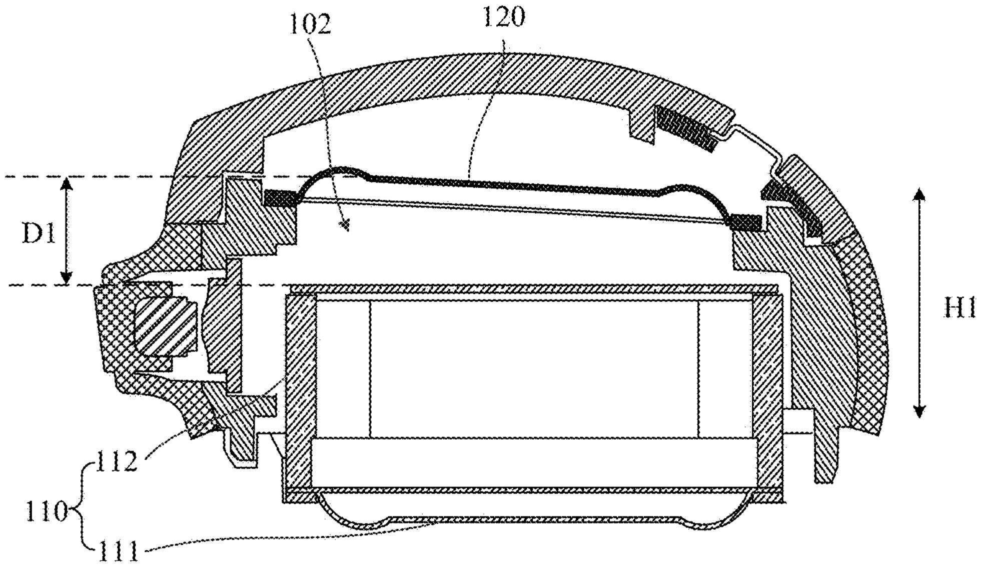
FIG. 2 is a schematic diagram of a structure of a second cavity of an acoustic output apparatus provided in an embodiment of the present application.

Referring to FIG. 2, FIG. 2 is a schematic diagram of a structure of the second cavity 102 of the acoustic output apparatus 100 provided in an embodiment of the present application. In some embodiments, along a direction H1 from a first side to a second side, a thickness Dl of the second cavity 102 may be not greater than (less than or equal to) 3 mm, or the thickness D1 of the second cavity 102 may be not greater than 2 mm, or the thickness D1 of the second cavity 102 may be not greater than 1 mm. The thickness of the second cavity 102 may be a maximum distance from a side of the driving component 112 close to the second diaphragm 120 to the second diaphragm 120 along the direction H1 from the first side to the second side. Based on the volume formula, when the thickness of the second cavity 102 is not greater than 3 mm, the volume of the second cavity 102 is relatively small, and the acoustic output apparatus 100 may have excellent bass performance.

In some embodiments, the first diaphragm 111 and the voice coil 1123 may form a first vibration system, and the second diaphragm 120 may form a second vibration system. A resonance frequency of the second vibration system may be lower than a resonance frequency of the first vibration system, so that the acoustic output apparatus 100 has excellent bass performance under action of the two vibration systems. For example, in some embodiments, a ratio of the resonance frequency of the second vibration system to the resonance frequency of the first vibration system may be greater than 0 and not more than (less than or equal to) 0.7; or the ratio of the resonance frequency of the second vibration system to the resonance frequency of the first vibration system is greater than 0 but not more than 0.6; or the ratio of the resonance frequency of the second vibration system to the resonance frequency of the first vibration system is greater than 0 but not more than 0.5.

In some embodiments, the compliance of the second vibration system is greater than the compliance of the first vibration system, and a ratio of the compliance of the second vibration system to the compliance of the first vibration system is not less than (greater than or equal to) 1.5; or the ratio of the compliance of the second vibration system to the compliance of the first vibration system is not less than 2; or the ratio of the compliance of the second vibration system to the compliance of the first vibration system is not less than 3.

It can be understood that in the acoustic output apparatus 100 of the present application, it can be set that the ratio of the resonance frequency of the second vibration system to the resonance frequency of the first vibration system is not more than 0.7; or it can be set that the ratio of the compliance of the second vibration system to the compliance of the first vibration system is not less than 1.5; or it can be set that both the ratio of the resonance frequency of the second vibration system to the resonance frequency of the first vibration system is not more than 0.7 and the ratio of the compliance of the second vibration system to the compliance of the first vibration system is not less than 1.5. At this time, the second vibration system has relatively large compliance (i.e., relatively small elasticity) and relatively small mass, and the second vibration system can provide a lower low-frequency resonance frequency for the acoustic output apparatus 100, thereby improving the bass performance of the acoustic output apparatus 100.

In some embodiments, a mass of the second vibration system can be less than a mass of the first vibration system, and a ratio of the mass of the second vibration system to the mass of the first vibration system is not greater than 0.7 (greater than 0 and less than or equal to 0.7); or the ratio of the mass of the second vibration system to the mass of the first vibration system is not greater than 0.6; or the ratio of the mass of the second vibration system to the mass of the first vibration system is not greater than 0.5. At this time, the second vibration system with a smaller mass is more easily driven by the air spring so as to provide a low low-frequency resonance frequency for the apparatus.

In some embodiments, a mass of the second diaphragm 120 may be less than a mass of the first diaphragm 111, that is, the second diaphragm 120 is lighter than the first diaphragm 111, and the second diaphragm 120 has a smaller mass. At this time, the second diaphragm 120 is more easily driven by the air spring sealed inside the first cavity 101, and the second diaphragm 120 may provide the acoustic output apparatus 100 with a lower low-frequency resonance frequency than the first vibration system, so as to further improve the bass performance of the acoustic output apparatus 100.

In some embodiments, the compliance of the second diaphragm 120 may be greater than that of the first diaphragm 111, the second diaphragm 120 is softer than the first diaphragm 111, and the second diaphragm 120 may provide a low low-frequency resonance frequency for the acoustic output apparatus 100.

It should be understood that, in the acoustic output apparatus 100 of the present application, it may be set that the mass of the second diaphragm 120 is less than the mass of the first diaphragm 111, or it may be set that the compliance of the second diaphragm 120 is greater than the compliance of the first diaphragm 111, or it may be set that both the mass of the second diaphragm 120 is less than the mass of the first diaphragm 111 and the compliance of the second diaphragm 120 is greater than the compliance of the first diaphragm 111.

In some embodiments, an area of the second diaphragm 120 (for example, an area of an orthographic projection of the second diaphragm 120 on a reference plane parallel to the second diaphragm 120) may be greater than or equal to an area of the first diaphragm 111 (for example, an area of an orthographic projection of the first diaphragm 111 on a reference plane parallel to the first diaphragm 111), and a ratio of the area of the second diaphragm 120 to the area of the first diaphragm 111 may be not less than 1 (greater than or equal to 1); or the ratio of the area of the second diaphragm 120 to the area of the first diaphragm 111 may be not less than 1.3; or the ratio of the area of the second diaphragm 120 to the area of the first diaphragm 111 may be not less than 1.5. At this time, the second diaphragm 120 with a larger area may receive more vibration energy transferred by the air spring, and then the second diaphragm 120 may further provide the acoustic output apparatus 100 with a lower low-frequency resonance frequency than the first vibration system to a greater extent, thereby improving the bass performance of the acoustic output apparatus 100.

It should be understood that, in the embodiments of the present application, one, two, or three factors of the mass, compliance, and area of the second diaphragm 120 may be improved, so as to further improve the bass performance of the acoustic output apparatus 100. It should be noted that even if the area of the second diaphragm 120 is larger than that of the first diaphragm 111, the mass of the second diaphragm 120 can be smaller than that of the first diaphragm 111 by designing such as the material and local thinning structure of the second diaphragm 120.

The acoustic output apparatus 100 in the embodiments of the present application, by improving the factors such as the mass, compliance and area of the second diaphragm 120, and the factors such as the resonance frequency, compliance and mass of the first and second vibration systems, the second diaphragm 120 may receive the vibration energy transferred by the first vibration system to a greater extent and have a low vibration amplitude, and the second diaphragm 120 may provide a lower low-frequency resonance frequency than the first vibration system to improve the bass performance of the acoustic output apparatus 100, thereby reducing nonlinear distortion of the acoustic output apparatus 100 and the earphone 10. Meanwhile, since the first cavity 101, which is formed by the space between the side of the second diaphragm 120 close to the driving component 112 and the side of the first diaphragm 111 close to the driving component 112 and the housing structure 130, is a sealed cavity, compared to the sound transmission through the sound guide tube in the related art, such double-diaphragm vibration system of the present application does not have the frictional sound caused by compressing the air, which can further improve the sound quality of the acoustic output apparatus 100.

Based on the structure of the foregoing acoustic output apparatus 100, referring to FIG. 1 again, the acoustic output apparatus 100 may further include a third cavity 103.

The third cavity 103 is formed between a side of the first diaphragm 111 away from the driving component 112 and the housing structure 130. For example, the housing structure 130 located on one side of the first diaphragm 111 away from the driving component 112 may enclose with the first diaphragm 111 to form the third cavity 103. The housing structure 130 further includes at least one first sound output hole 131, where the first sound output hole 131 may be provided on the housing structure 130 at one side of the first diaphragm 111 away from the driving component 112, the first sound output hole 131 may penetrate the housing structure 130 along a thickness direction of the housing structure 130, and the first sound output hole 131 may be communicated with the third cavity 103 so as to achieve acoustic coupling. In a working state, the driving component 112 may drive the first diaphragm 111 to vibrate and radiate a sound signal to the third cavity 103, where the sound signal may be exported to exterior of the acoustic output apparatus 100 through the first sound output hole 131.

Figure 3:
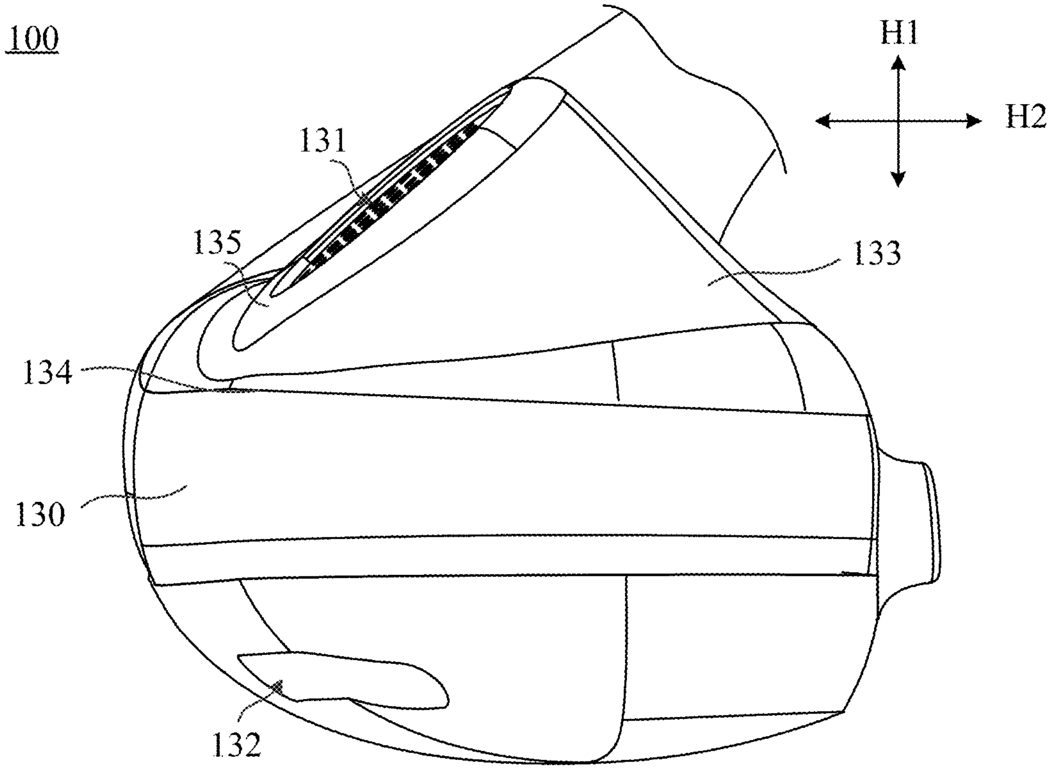
FIG. 3 is a schematic diagram of a three-dimensional structure of an acoustic output apparatus provided in an embodiment of the present application.

In some embodiments, the housing structure 130 may be provided with one or more first sound output holes 131. Referring to FIG. 3, FIG. 3 is a schematic diagram of a three-dimensional structure of the acoustic output apparatus 100 provided in an embodiment of the present application. The housing structure 130 at the side of the first diaphragm 111 away from the driving component 112 may include a protrusion structure 133 and a first surface 134, where the protrusion structure 133 may be connected to and protrude from the first surface 134, and the protrusion structure 133 may be provided with a first end face 135, one or more first sound output holes 131 may be formed on the first end face 135. When one first sound output hole 131 is formed on the first end face 135, the first sound output hole 131 may have a relatively large cross-sectional area, so as to facilitate exporting more sound signals to outside of the acoustic output apparatus 100, and when a plurality of first sound output holes 131 are formed on the first end face 135, the plurality of first sound output holes 131 may be evenly or unevenly spaced and provided on the first end face 135.

It should be understood that, the one or more first sound output holes may be provided on the housing structure 130 that is provided directly opposite to the first diaphragm 111, or provided on the housing structure 130 that is opposite to or not opposite to the first diaphragm 111. It should be understood that, as shown in FIG. 3, along a width direction H2 of the protrusion structure 133, when the acoustic output apparatus 100 or the earphone 10 is worn on a human body, a minimum distance between an edge of one side of the protrusion structure 133 or the first end face 135 (for example, when the acoustic output apparatus 100 or earphone 10 is worn on an ear of the human body, an edge of one side of the protrusion structure 133 or the first end face 135 closer to the ear) and the first surface 134 (along the thickness direction H1 of the acoustic output apparatus 100) is smaller than a minimum distance between an edge of the other side thereof and the first surface 134 (along the thickness direction H1 of the acoustic output apparatus 100), so that the first end face 135 where the first sound output hole 131 is located may be an inclined surface (for example, the first end face 135 in FIG. 3 is an inclined surface with a lower left side and a higher right side), and a distance from the first sound output hole 131 to an external acoustic pore of the ear is relatively small, which can further improve the acoustic performance of the acoustic output apparatus 100 and the earphone 10. It should be understood that, as shown in FIG. 3, in the width direction H2 of the protrusion structure 133, when the acoustic output apparatus 100 or the earphone 10 is worn on a human body, the first surface 134 includes a first side edge close to the ear and a second side edge away from the ear. A minimum distance between a projection of the first end face 135 on the first surface 134 and the first side edge is smaller than a minimum distance between the projection and the second side edge, so that the first end face 135 deviates towards the ear (for example, in FIG. 3, the first end face 135 deviates from a central axis of the first surface 134 extending along a length direction). At this time, the distance between the first sound output hole 131 and the external acoustic pore of the ear is short, which can further improve the acoustic performance of the acoustic output apparatus 100 and the earphone 10.

It should be understood that the one or more first sound output holes 131 may be circular, elliptical, polygonal or other irregular shapes, and there is no limitation on this in the embodiments of the present application.

Figure 4:
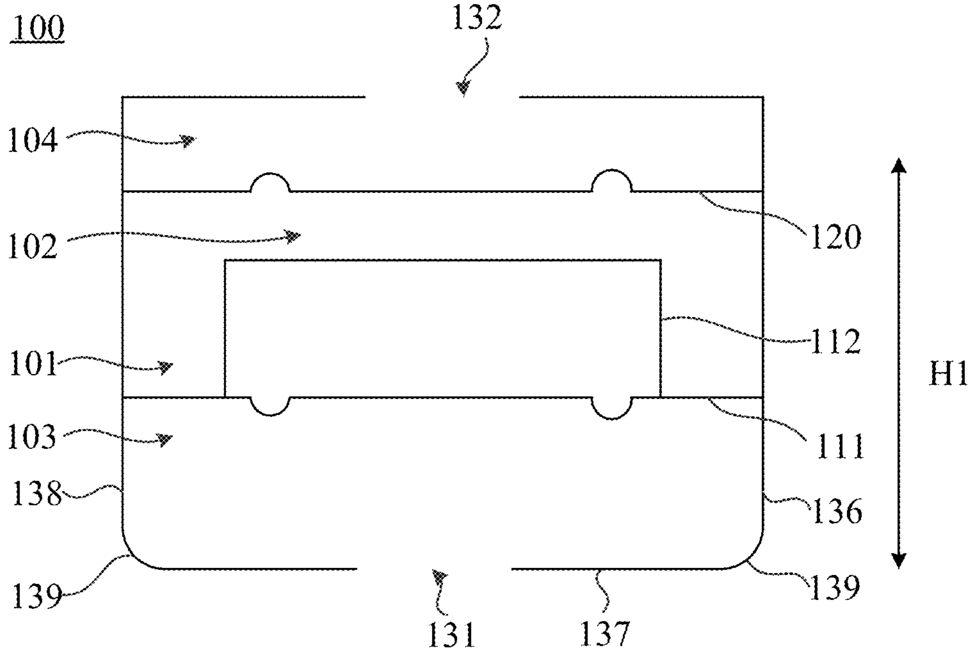
FIG. 4 is a schematic diagram of a structure of a third cavity of an acoustic output apparatus provided in an embodiment of the present application.

In some embodiments, reference may be made to FIG. 4, FIG. 4 is a schematic diagram of a structure of the third cavity 103 of the acoustic output apparatus 100 provided in an embodiment of the present application. Part or entirety of an inner cavity face of the third cavity 103 may be a first curved face 139. Here the first curved face 139 may be an integral curved face, or may be a plurality of curved faces spaced apart from each other. For example, the inner cavity face of the third cavity 103 may include a first face 136, a second face 137, and a third face 138, where the first face 136 and the third face 138 are provided opposite to each other, and the second face 137 may be provided opposite to the first diaphragm 111; and where the first face 136 and the second face 137, as well as the second face 137 and the third face 138 may all be smoothly transitioned and connected by the first curved face 139. At this time, the first curved face 139 may include two curved faces spaced apart from each other. Of course, in another embodiment, one or more of the first face 136, the second face 137 and the third face 138 may be the first curved face 139.

It can be understood that, an arc radius of the first curved face 139 may be not less than 1.5 mm, or not less than 2 mm, or not less than 2.5 mm, or not less than 3 mm. A radian of the first curved face 139 may be not less than 30°, or not less than 40°, or not less than 45°. The present application may perform the above-mentioned design on the arc radius or the radian of the first curved face 139, or perform the above-mentioned design on both the arc radius and the radian of the first curved face 139.

Based on the structure of the acoustic output apparatus 100 mentioned above, referring to FIGS. 1 to 4 again, the acoustic output apparatus 100 can further include a fourth cavity 104.

A side of the second diaphragm 120 away from the electroacoustic transducer 110 forms the fourth cavity 104 with the housing structure 130, for example, the housing structure 130 located at the side of the second diaphragm 120 away from the electroacoustic transducer 110 may enclose with the second diaphragm 120 to form the fourth cavity 104. Where the housing structure 130 further includes at least one second sound output hole 132, the second sound output hole 132 may be provided on the housing structure 130 at the side of the second diaphragm 120 away from the electroacoustic transducer 110, the second sound output hole 132 may penetrate the housing structure 130 along a thickness direction of the housing structure 130, and the second sound output hole 132 may be communicated with the fourth cavity 104 and achieve an acoustic coupling. In a working state, the driving component 112 drives the first diaphragm 111 to vibrate and pushes the air spring to vibrate, causing the second diaphragm 120 to passively vibrate and radiate a sound signal to the fourth cavity 104, and the sound signal is exported to an exterior of the acoustic output apparatus 100 through the second sound output hole 132.

It should be understood that, one or more second sound output holes 132 may be provided on the housing structure 130. The one or more second sound output holes 132 may be provided on the housing structure 130 that is provided directly opposite, laterally opposite, or not opposite to the second diaphragm 120. The one or more second sound output holes 132 may be circular, elliptical, polygonal, or other irregular shapes. The position and shape of the second sound output holes 132 are not limited in the embodiment of the present application.

Figure 5:
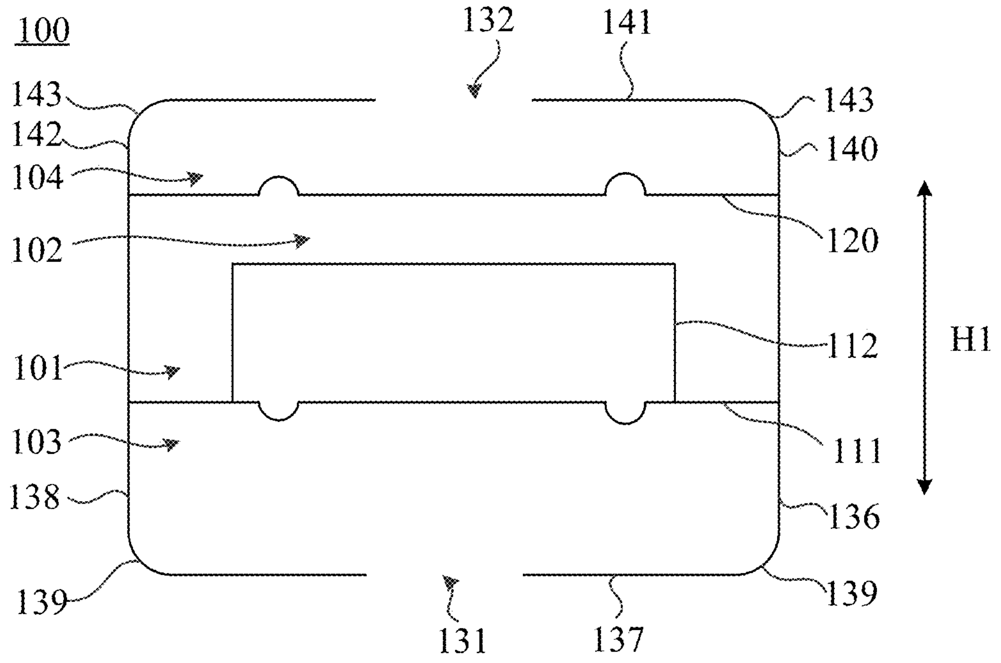
FIG. 5 is a schematic diagram of a structure of a fourth cavity of an acoustic output apparatus provided in an embodiment of the present application.

In some embodiments, reference may be made to FIG. 5, FIG. 5 is a schematic diagram of a structure of the fourth cavity 104 of the acoustic output apparatus 100 provided in an embodiment of the present application. Part or entirety of an inner cavity face of the fourth cavity 104 may be a second curved face 143. Here, the second curved face 143 may be an integral curved face, or may be a plurality of curved faces spaced apart from each other. For example, the inner cavity face of the fourth cavity 104 may include a fourth face 140, a fifth face 141 and a sixth face 142, where the fourth face 140 and the sixth face 142 are provided opposite to each other, and the fifth face 141 may be provided opposite to the second diaphragm 120; where the fourth face 140 and the fifth face 141, as well as the fifth face 141 and the sixth face 142 may all be smoothly transitioned and connected by the second curved face 143. At this time, the second curved face 143 may include two curved faces spaced apart from each other. Of course, in another embodiment, one or more of the fourth face 140, fifth face 141, and sixth face 142 may be the second curved face 143.

It can be understood that, an arc radius of the second curved face 143 may be not less than 1.5 mm, or not less than 2 mm, or not less than 2.5 mm, or not less than 3 mm. A radian of the second curved face 143 may be not less than 30°, or not less than 40°, or not less than 45°. The present application may perform the above-mentioned design on the arc radius or the radian of the second curved face 143, or perform the above-mentioned design on both the arc radius and the radian of the second curved face 143.

The acoustic output apparatus 100 in the embodiments of the present application may include both the third cavity 103 and the fourth cavity 104, and the third cavity 103 and the fourth cavity 104 can be a front cavity and a rear cavity of the acoustic output apparatus 100, respectively. The acoustic output apparatus 100 radiates sound outwards through the two cavities and the sound output holes provided on the cavities, and thus the acoustic output apparatus 100 can have excellent sound generation performance. At the same time, when the inner cavity faces of the third cavity 103 and the fourth cavity 104 are in an curved structure, the volume of the third cavity 103 and the fourth cavity 104 can be reduced, and a propagation direction of the sound signal in the two cavities can be in arbitrary direction, thereby reducing the probability of generating standing wave energy, so that the acoustic output apparatus 100 can have excellent acoustic performance.

Figure 6:
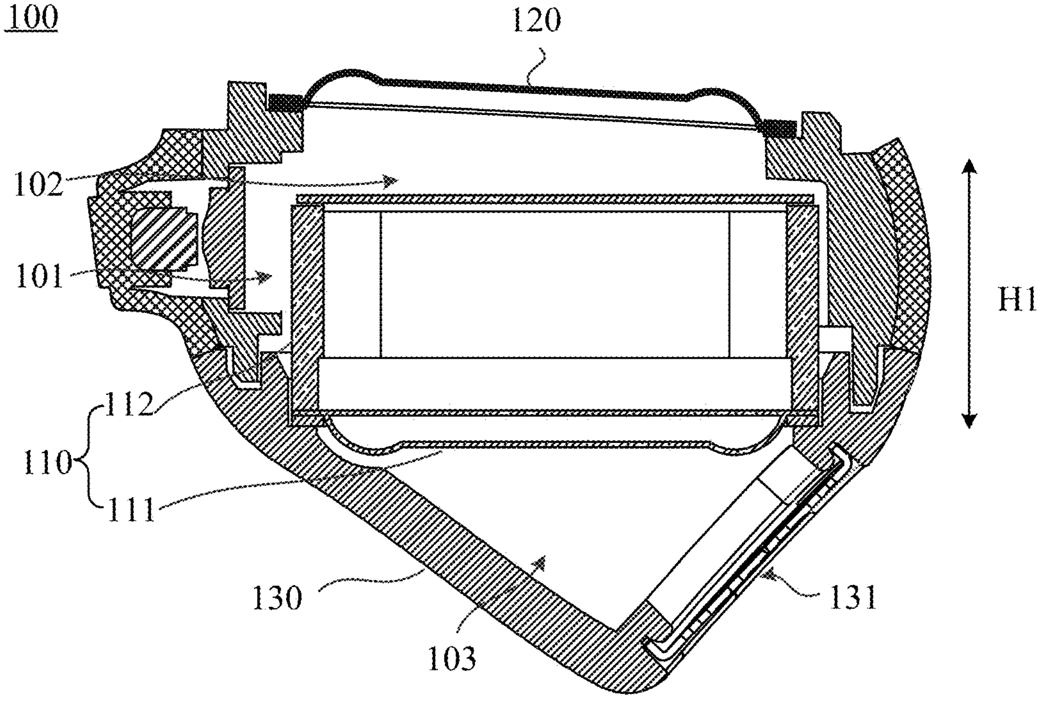
FIG. 6 is a schematic diagram of a second structure of an acoustic output apparatus provided in an embodiment of the present application.

In order to further reduce an adverse effect caused by the standing wave, reference may be made to FIG. 6, FIG. 6 is a schematic diagram of a second structure of the acoustic output apparatus 100 provided in an embodiment of the present application. The acoustic output apparatus 100 may not include the fourth cavity 104, for example, the housing structure 130 may not include the housing structure located at a side of the second diaphragm 120 away from the electroacoustic transducer 110. At this time, the sound generated by the second diaphragm 120 may directly propagate to an exterior of the acoustic output apparatus 100, and a sound signal generated by the second diaphragm 120 is not easily to produce a reflection phenomenon during propagation process, thereby reducing the probability of generating standing wave energy.

Figure 7:
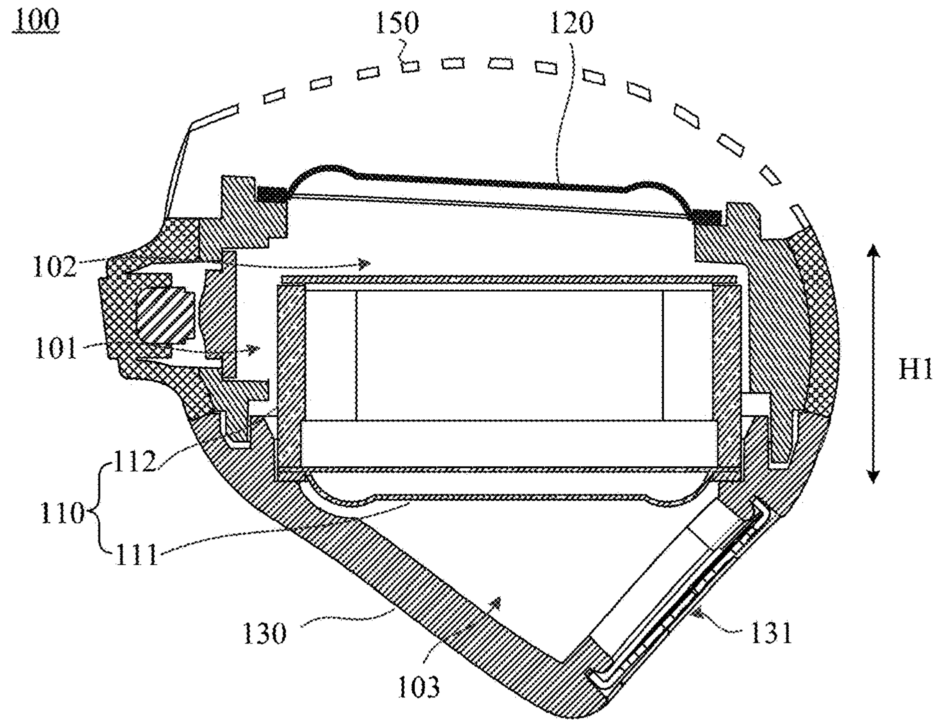
FIG. 7 is a schematic diagram of a third structure of an acoustic output apparatus provided in an embodiment of the present application.

Referring to FIG. 7, FIG. 7 is a schematic diagram of a third structure of the acoustic output apparatus 100 provided in an embodiment of the present application. The acoustic output apparatus 100 can further include a protective structure 150.

The protective structure 150 is provided at a side of the second diaphragm 120 away from the electroacoustic transducer 110, the protective structure 150 can be connected to the housing structure 130, and the protective structure 150 is configured to separate the second diaphragm 120 from an exterior of the acoustic output apparatus 100 and is capable of propagating a sound generated by the second diaphragm 120 to the exterior of the acoustic output apparatus 100.

It should be understood that, the protective structure 150 may be a filter screen structure. For example, the protective structure 150 may be a metal screen cover or a plate-like structure formed with at least one hole structure.

The acoustic output apparatus 100 in the embodiments of the present application is provided with the protective structure 150, and at this time, the acoustic output apparatus 100 does not form a fourth cavity 104 that is formed by a side of the second diaphragm 120 away from the electroacoustic transducer 110 and the housing structure 130, and the protective structure 150 substantially does not block or reflect the sound generated by the second diaphragm 120 or produce other effect on it, and the protective structure 150 mainly plays a role in protecting the second diaphragm 120, and a sound signal generated by the second diaphragm 120 is not easily to produce a standing wave phenomenon in a propagation process, and the second diaphragm 120 can directly radiate the sound signal to the exterior of the acoustic output apparatus 100 to achieve a good sound offset in a far field with a signal generated by the first sound output hole 131, so that sound leakage of the acoustic output apparatus 100 and the headphone 10 can be reduced.

It should be noted that the acoustic output apparatus 100 in the present application may include the third cavity 103 and the fourth cavity 104 as shown in FIG. 1 to FIG. 5, or may include the third cavity 103 but not include the fourth cavity 104, as shown in FIG. 6, or may include the third cavity 103, not include the fourth cavity 104 but include the protective structure 150, as shown in FIG. 7. Of course, the acoustic output apparatus 100 in the embodiments of the present application may include the fourth cavity 104 but not include the third cavity 103, or include neither the third cavity 103 nor the fourth cavity 104, or include the protective structure 150 but not include the third cavity 103. The embodiments of the present application do not limit a specific structure of the acoustic output apparatus 100.

Figure 8:
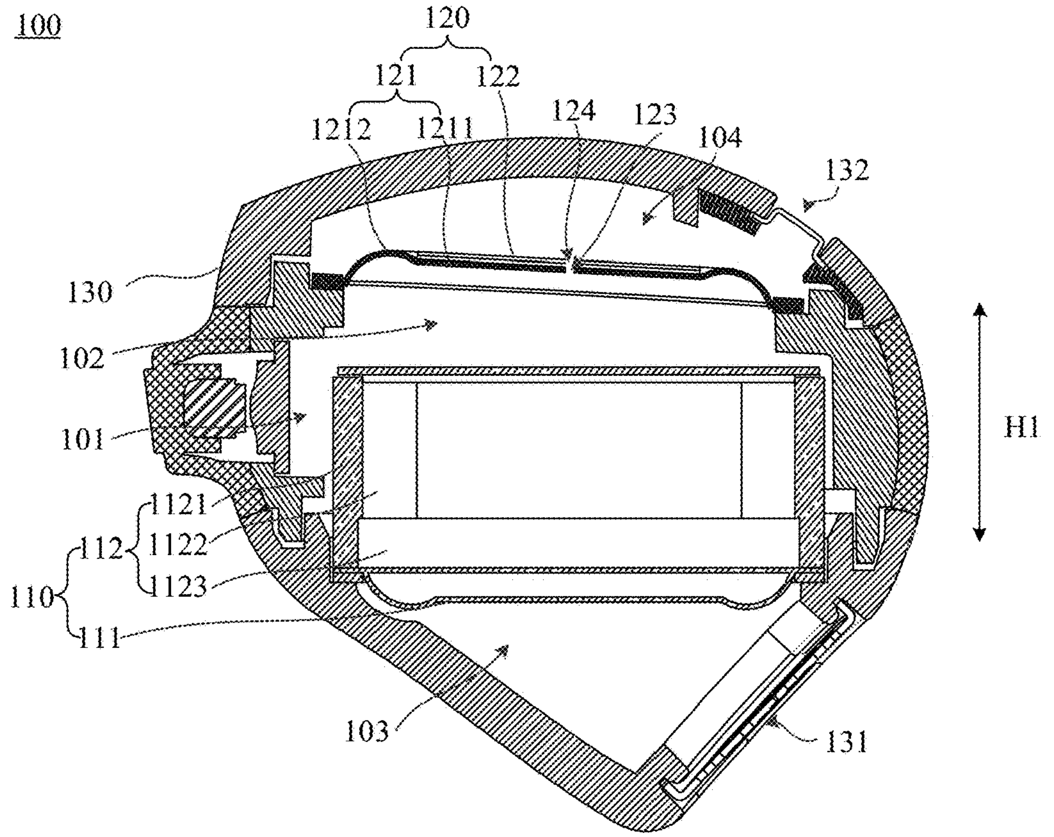
FIG. 8 is a schematic diagram of a fourth structure of an acoustic output apparatus provided in an embodiment of the present application.

Reference may be made to FIG. 8 in combination with FIGS. 1 to 7, FIG. 8 a schematic diagram of a fourth structure of an acoustic output apparatus provided in an embodiment of the present application. The second diaphragm 120 of the acoustic output apparatus 100 of the present application may include a diaphragm body 121 and a flat central sticker 122.

The diaphragm body 121 includes a middle flat portion 1211 and a folded ring portion 1212, which are sequentially connected, where the folded ring portion 1212 can protrude from the middle flat portion 1211 along a side away from the electroacoustic transducer 110, the middle flat portion 1211 can be formed within an area enclosed by the folded ring portion 1212, and the folded ring portion 1212 can be connected to the housing structure 130 so as to realize a fixed connection between the second diaphragm 120 and the housing structure 130. The flat central sticker 122 is adhered to a surface of the middle flat portion 1211, and the term "adhered" herein refers to that the flat central sticker 122 is stacked on one side of a surface of the middle flat portion 1211 and is connected to the surface. For example, the flat central sticker 122 can be, but is not limited to, adhered to a surface of the middle flat portion 1211 away from the electroacoustic transducer 110. Where at least part of the flat central sticker 122 can be provided opposite to the middle flat portion 1211, and an orthographic projection of at least part of the flat central sticker 122 on the diaphragm body 121 can overlap the middle flat portion 1211.

In some embodiments, the middle flat portion 1211 may be provided with a first through hole 123, and the first through hole 123 may penetrate the middle flat portion 1211 along a thickness direction of the middle flat portion 1211, and the first through hole 123 is conducive to dissipation of heat generated during operation of the electroacoustic transducer 110.

In some embodiments, the flat central sticker 122 may be provided with a second through hole 124 communicated with the first through hole 123. For example, the second through hole 124 is provided on an area of the flat central sticker 122 opposite to the middle flat portion 1211. The second through hole 124 may be directly provided opposite to and communicated with the first through hole 123, the first through hole 123 may be communicated with the fourth cavity 104 through the second through hole 124, and the first through hole 123 and the second through hole 124 are more conducive to dissipation of heat generated during operation of the electroacoustic transducer 110. It should be noted that the second through hole 124 may also be partially staggered with and communicated with the first through hole 123, and specific arrangement positions of the second through hole 124 and the first through hole 123 are not limited in the present application.

In some embodiments, the second diaphragm 120 may further include one or both of a first blocking member and a second blocking member, where the first blocking member includes a mesh structure and can be connected to the diaphragm body 121, and the first blocking member can be matched with the first through hole 123 so as to cover the first through hole 123. It can be understood that, the first blocking member may be provided within the first through hole 123 (including being provided at an opening of the first through hole 123 in the middle flat portion 1211), or the first blocking member may be provided on a side of the middle flat portion 1211 away from the flat central sticker 122 and cover the first through hole 123. The second blocking member includes a mesh structure, the second blocking member can be connected to the flat central sticker 122, and the second blocking member can be matched with the second through hole 124 and cover the second through hole 124. It can be understood that, the second blocking member may be provided in the second through hole 124 (including being provided at an opening of the second through hole 124 in the flat central sticker 122), or the second blocking member may be provided on a side of the flat central sticker 122 away from the middle flat portion 1211 and cover the second through hole 124.

It should be understood that, at least one of the first blocking member and the second blocking member may be a waterproof breathable film or a low breathable mesh structure. The waterproof breathable film may be prepared from any one of polytetrafluoroethylene, expanded polytetrafluoroethylene, polyurethane resin, thermoplastic polyurethane elastomer and the like.

The middle flat portion 1211 of the second diaphragm 120 in the present application is provided with the first through hole 123, the flat central sticker 122 is provided with the second through hole 124, and the second diaphragm 120 further includes the first blocking member covering the first through hole 123 and the second blocking member covering the second through hole 124. On one hand, the above-mentioned structure of the second diaphragm 120 can achieve the purpose of waterproofing, and at the same time can dissipate heat generated in operation of the electroacoustic transducer 110, and help the internal cavity of the acoustic output apparatus 100 to relieve pressure, so as to balance gas pressure of the first cavity 101 and the fourth cavity 104.

It should be noted that, the first diaphragm 111 may also have a structure similar to the second diaphragm 120. In this case, the acoustic output apparatus 100 may further dissipate the heat generated in operation of the electroacoustic transducer 110, and the gas pressure of the third cavity 103 and the fourth cavity 104 may also be balanced. A specific structure of the first diaphragm 111 will not be described in detail here. It should be noted that, in the embodiments shown in FIG. 1 to FIG. 7, the first diaphragm 111 may also include the diaphragm body 121 and the flat central sticker 122.

Based on the acoustic output apparatus 100, an embodiment in the present application further provides an earphone 10, and the earphone 10 may be a wireless earphone structure, a wired earphone structure, an in-ear earphone structure, a semi-in-ear earphone structure, an earplug earphone structure, an open earphone structure, or the like. The embodiments in the present application do not limit a specific type of the earphone 10.

Figure 9:
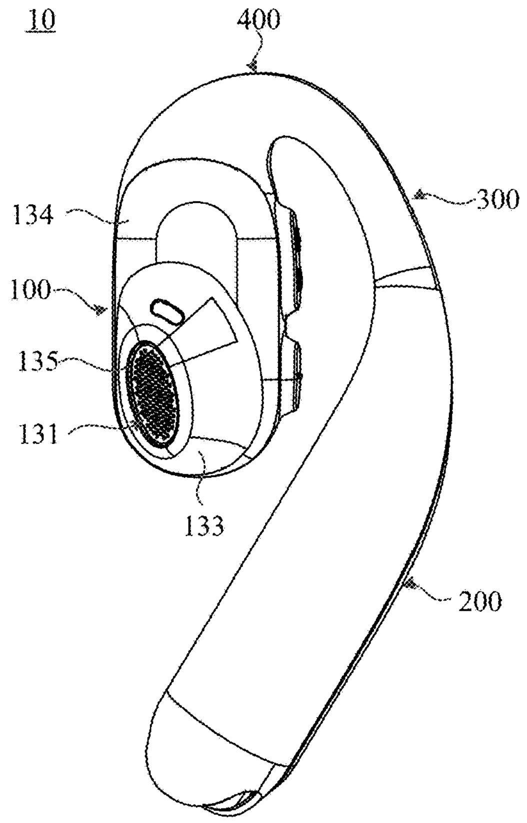
FIG. 9 is a schematic diagram of a structure of an earphone provided in an embodiment of the present application.
Figure 10:
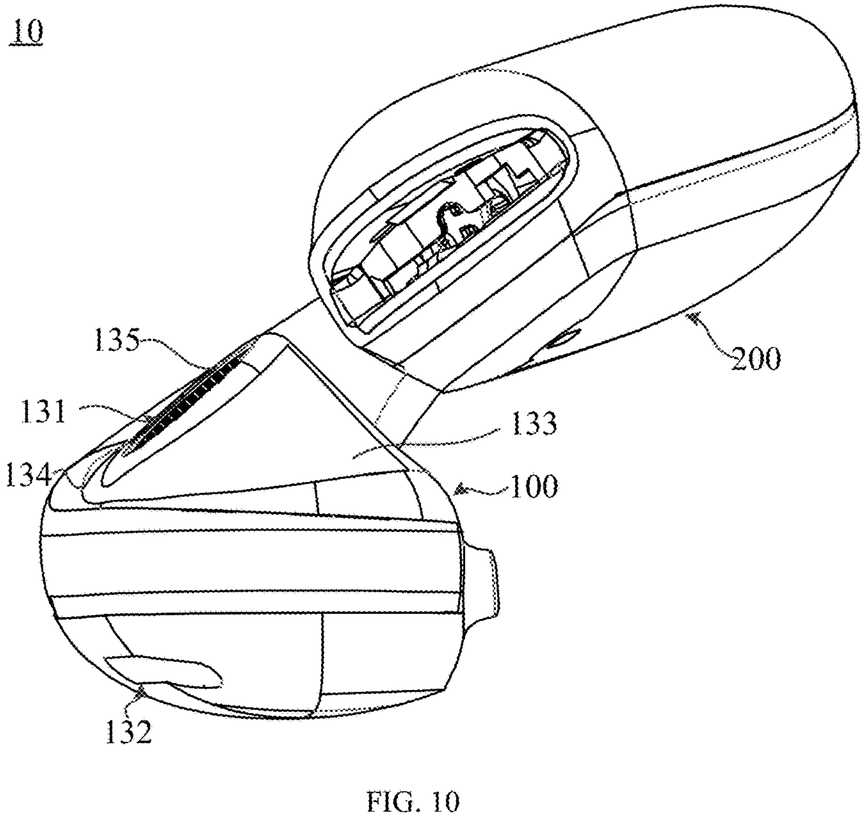
FIG. 10 is a schematic structural diagram of the earphone shown in FIG. 9 in another direction.
Figure 11:
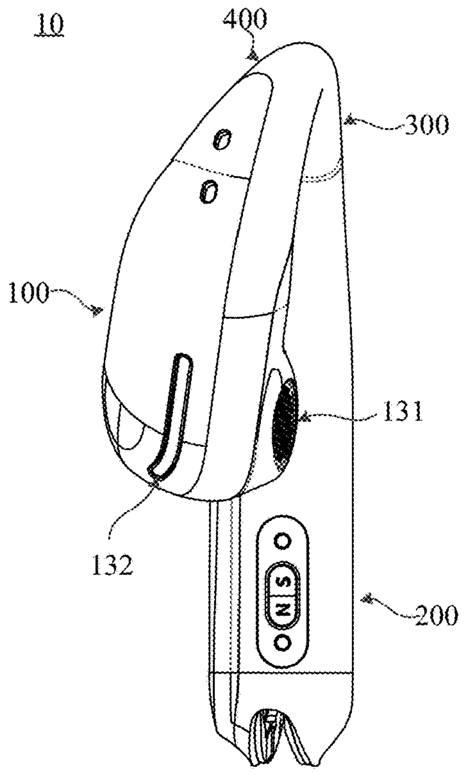
FIG. 11 is a schematic structural diagram of the earphone shown in FIG. 9 in still another direction.
Figure 12:
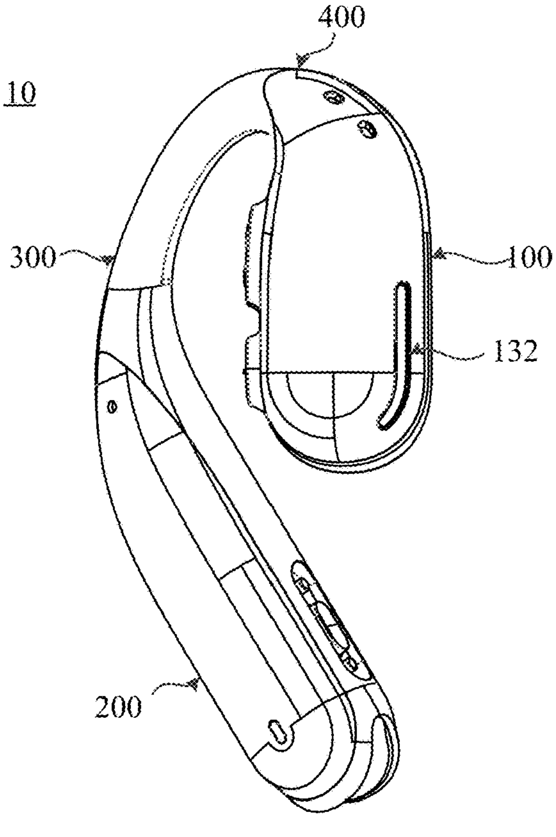
FIG. 12 is a schematic structural diagram of the earphone shown in FIG. 9 in yet another direction.

Referring to FIG. 9 to FIG. 12, FIG. 9 a schematic diagram of a structure of an earphone 10 provided in an embodiment of the present application, FIG. 10 is a schematic structural diagram of the earphone 10 shown in FIG. 9 in another direction, FIG. 11 is a schematic structural diagram of the earphone 10 shown in FIG. 9 in still another direction, and FIG. 12 is a schematic structural diagram of the earphone 10 shown in FIG. 9 in yet another direction. The earphone 10 may include the acoustic output apparatus 100 according to any one of the foregoing embodiments. The earphone 10 can further include a functional structure 200, an ear hook structure 300, and a transition structure 400. The acoustic output apparatus 100 may also be referred to as a sound generation structure of the earphone 10.

Figure 13:
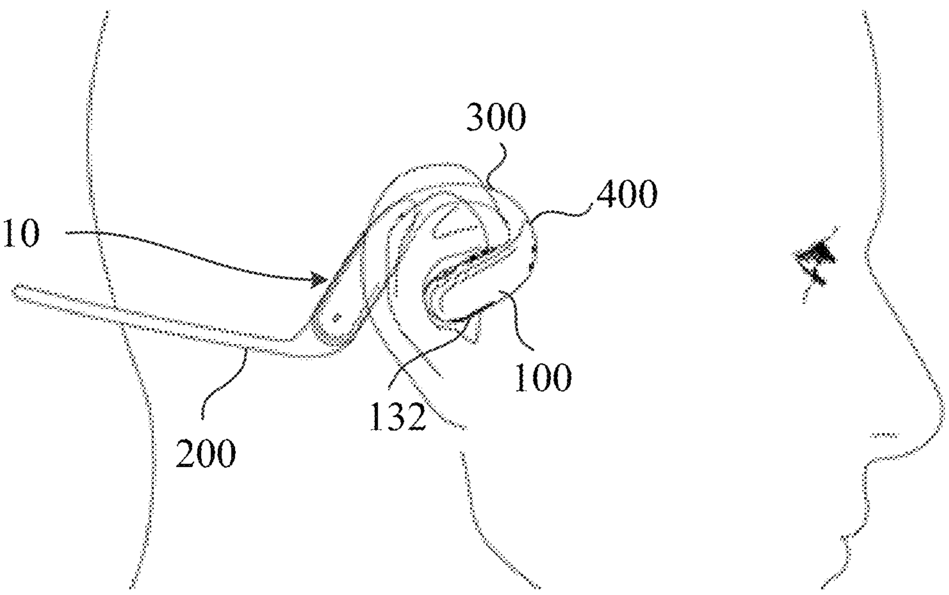
FIG. 13 is a schematic diagram of an application scenario of the earphone shown in FIG. 9.
Figure 14:
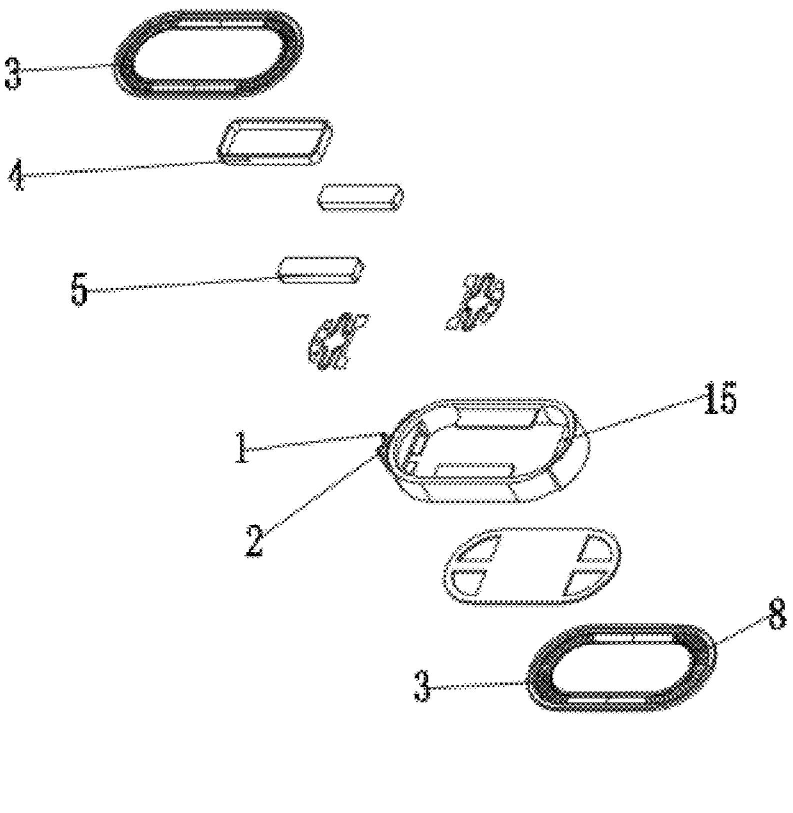
FIG. 14 is an exploded view of an ultra-linear multi-magnetic double-diaphragm loudspeaker provided in an embodiment of the present application.
Figure 15:
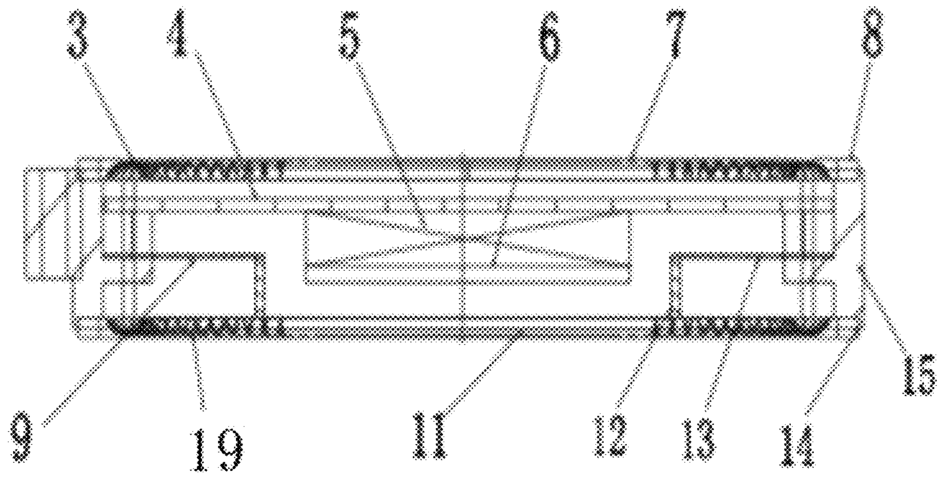
FIG. 15 is a side-view schematic structural diagram of an ultra-linear multi-magnetic double-diaphragm loudspeaker provided in an embodiment of the present application.
Figure 16:
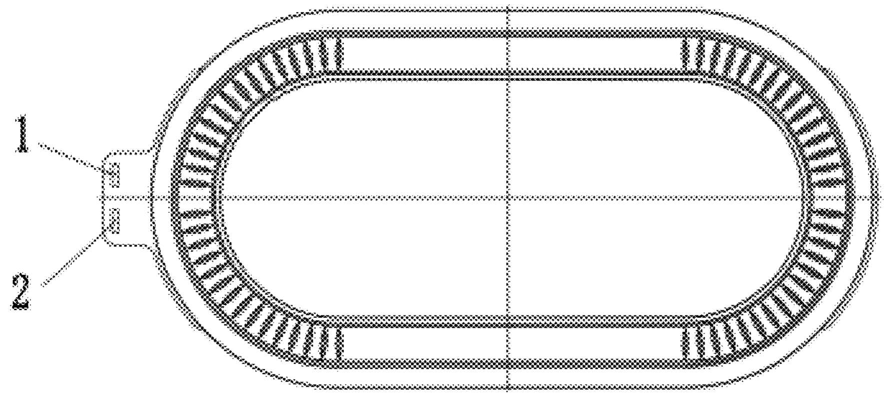
FIG. 16 is a schematic diagram of a partial structure of a first pin provided in an embodiment of the present application.
Figure 17:
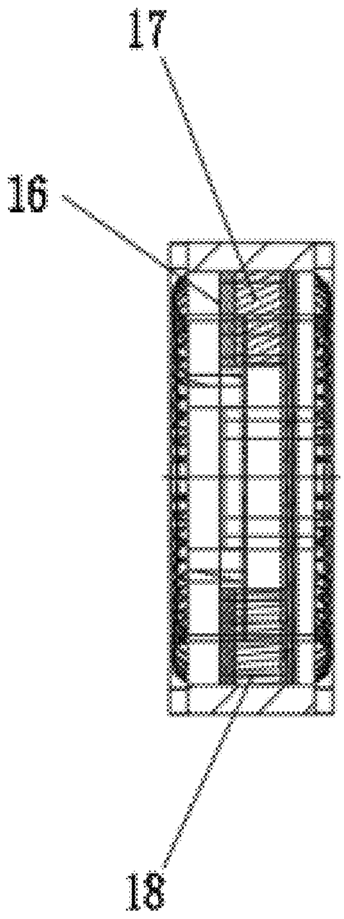
FIG. 17 is a side-view schematic diagram of an internal structure of an ultra-linear multi-magnetic double-diaphragm loudspeaker provided in an embodiment of the present application.

Reference may be made to FIG. 13 in combination with FIGS. 9 to 12, and FIG. 13 is a schematic diagram of an application scenario of the earphone 10 shown in FIG. 9. When the earphone 10 is worn on a human body, the functional structure 200 may be located on a rear side of an auricle of a human ear, and part of the functional structure 200 may be hidden between the rear side of the auricle and a human head, where the rear side of the auricle is a side of the auricle close to the human head. The ear hook structure 300 is connected to the functional structure 200, and the ear hook structure 300 can be connected to a sound generation structure (i.e., the acoustic output apparatus 100) through the transition structure 400. The ear hook structure 300 can support the headphone 10 to be worn on the auricle, and can enable the transition structure 400 and the sound generation structure (the acoustic output apparatus 100) to be located on a front side of the auricle, where the front side of the auricle is a side of the auricle away from the human head.

It should be understood that, the earphone 10 can further include a battery, a mainboard and other structure, and the battery and the mainboard may be provided in the functional structure 200. Of course, the earphone 10 can further include other structure, such as but not limited to a Bluetooth antenna module, a USB charging module, etc. This is not limited in the embodiments in the present application.

According to the earphone 10 in the embodiments of the present application, the first diaphragm 111, the driving component 112, the air spring in the first cavity 101, and the second diaphragm 120 of the acoustic output apparatus 100 may form a double-diaphragm vibration sound generation system. Under vibration of the two diaphragms, the attenuation of the acoustic output apparatus 100 under low-frequency sound signal is relatively small, and when a volume of the second cavity 102, which is formed by the second diaphragm 120, a side of the electroacoustic transducer 110 close to the second diaphragm 120 and the housing structure 130, is not greater than ⅕ of an equivalent volume of the electroacoustic transducer 110, the volume of the second cavity 102 is relatively small, and the second diaphragm 120 may provide a low low-frequency resonance frequency for the acoustic output apparatus 100, and the acoustic output apparatus 100 may provide a low-frequency signal having a wide frequency spectrum, so that the acoustic output apparatus 100 may have excellent bass performance. Furthermore, since the second cavity 102 is a sealed space, compared with a solution of using a sound guide tube, the acoustic output apparatus 100 in the present application does not have a frictional sound caused by compressing the air, which can further improve the sound quality of the acoustic output apparatus 100. Furthermore, compared with a solution of providing two sets of independent electroacoustic transducers 110 in the related art, the second diaphragm 120 in the present application is a passive diaphragm and occupies a relatively small space, so that the earphone 10 in the present application can achieve a miniaturized design, and the earphone 10 is smaller and easier to wear.

EMBODIMENT

As shown in FIG. 14 to FIG. 17, an embodiment of the present application provides an ultra-linear multi-magnetic double-diaphragm loudspeaker, including a first pin 1, a second pin 2 provided on a side of an outer wall of the first pin 1, where outer walls of both the first pin 1 and the second pin 2 are provided inside a support 15, a second copper ring 14 is provided inside the support 15, a second FPC 13 is provided on one side of interior of the support 15, and a first FPC 9 is provided on the other side of interior of the support 15. A first copper ring 8 is provided on an upper surface of the support 15, and a composite diaphragm 7 is provided on a side of the first copper ring 8. An interior of the support 15 is provided with a composite membrane 11, which uses an ultra-linear structure. Ultra-linear loudspeaker refers to that the loudspeaker has a relatively excellent linear frequency response.

A first folded ring 3 is provided inside the first copper ring 8, a magnet 5 is provided above the composite membrane 11, and a first washer 6 is provided on a side of the magnet 5, where the first washer 6 achieves a buffering effect.

A magnetic conduction plate 4 is provided above the magnet 5, and the magnetic conduction plate 4 is provided below the first folded ring 3, where the magnet 5 provides an adsorption effect. An outer wall of the support 15 is provided with upper and lower pairs of first copper rings 18, and one side of an interior of the support 15 is provided with a first side magnet 17, where the first side magnet 17 provides the effect of further adsorption and fixation.

The other side of the interior of the support 15 is provided with a second side magnet 18, and a second washer 16 is provided both above the second side magnet 18 and above the first side magnet 17, respectively. A second folded ring 19 is provided below the support 15, and a left-right symmetrical voice coil 12 is provided above the composite membrane 11.

The ultra-linear multi-magnetic double-diaphragm loudspeaker uses a square multi-magnetic circuit structure which includes a neodymium-iron-boron magnetic steel, where the magnetic steel is formed by sintering and cutting a rare earth material and has a magnetic field strength much higher than a ferrite magnetic steel; and further uses a composite material to prepare diaphragms (double diaphragms), where a purpose of using the composite diaphragm is to make the diaphragms have improved rigidity, reduced density and appropriate internal damping;

where if the mobile phones use the ultra-linear loudspeaker, the sound produced by them will not be distorted when the mobile phones are using the loudspeakers.

The working principle of the ultra-linear multi-magnetic double-diaphragm loudspeaker is as follows: when the ultra-linear multi-magnetic double-diaphragm loudspeaker needs to be used, the first pin 1 and the second pin 2 are firstly used to perform convenient mounting, and then the magnetic conduction plate 4 and the magnet 5 are to pass through the loudspeaker so as to achieve an adsorption effect, and the apparatus uses a square multi-magnetic circuit structure of neodymium-iron-boron magnetic steel, which is formed by sintering and cutting a rare earth material and has a magnetic field strength much higher than a ferrite magnetic steel, and at the same time, the present apparatus uses a composite material to prepare diaphragms (double diaphragms), and a purpose of using the composite diaphragm is to make the diaphragms have improve rigidity, reduced density and appropriate internal damping.

It should be understood that, in the description of the embodiments in the present application, the orientations or position relationships indicated by the terms "center", "longitudinal", "transversal", "length", "width", "thickness", "upper", "lower", "front", "rear", "left", "right", "vertical", "horizontal", "top", "bottom", "inner", "outer", "clockwise", "counterclockwise", etc. are based on the orientations or position relationships shown in the accompanying drawings, and are only for the convenience of describing the present application and simplifying the description, rather than indicating or implying that the indicated apparatus or component must have a specific orientation or be constructed and operated in a specific orientation, and thus they cannot be understood as a limitation on the present application.

It should be noted that, in the description of the present application, terms such as "first", "second", and "third" are only used for distinguishing similar objects, and cannot be understood as indicating or implying relative importance or implicitly indicating the quantity of indicated technical features. Thus, the features defined by "first", "second", and "third" may explicitly or implicitly include one or more such features. In the description of the present application, "a plurality of" means two or more than two, unless otherwise specified.

In the present application, unless otherwise specified or limited, the terms "mount", "connect", "communicate", and "fix" should be broadly understood, for example, it may be connection, detachable connection, or integrated; or it may be mechanical connection or electrical connection; or it may be direct connection or indirect connection through an intermediate medium; or it may be inner communication of two elements or interaction relationships of two elements. For ordinary those skilled in the art, the specific meanings of the above terms in the present application can be understood based on specific circumstances.

In the present application, unless otherwise specified and limited, the wording that a first feature is "above" or "under" a second feature may include an embodiment in which the first feature is in direct contact with the second feature, and may also include an embodiment in which the first feature is not in direct contact with the second feature, but is contacted through another feature between them. Furthermore, the wording that the first feature is "on", "above" or "on top of" the second feature may include an embodiment in which the first feature is directly or obliquely above the second feature, or just means that a horizontal height of the first feature is higher than that of the second feature. The wording that the first feature is "below", "under" or "on bottom of" the second feature include an embodiment in which the first feature is directly or obliquely below the second feature, or just means that a horizontal height of the first feature is lower than that of the second feature.

In the present application, the description referring to terms "an embodiment", "some embodiments", "example", "specific example", or "some examples" means that the specific features, structures, materials, or features described in conjunction with the embodiment or example are included in at least one embodiment or example of the present application. In the specification of the present application, the schematic expressions of the above terms should not be understood as necessarily referring to the same embodiments or examples. Furthermore, the above-described specific features, structures, materials, or characteristics may be combined in an appropriate manner in any one or more embodiments or examples. In addition, those skilled in the art may combine and recombine different embodiments or examples described in the specification.

The acoustic output apparatus and the earphone provided in the embodiments of the present application are described in detail in the above. The present application applies specific individual embodiments to illustrate principles and implementation methods of the present application, and the description of the foregoing embodiments is merely used to help understand the methods and core ideas of the present application. At the same time, those skilled in the art may make modifications to the specific embodiments and application scope based on the ideas of the present application. In summary, the contents of this specification should not be understood as a limitation of the present application.

What is claimed is:

1. An acoustic output apparatus, comprising:

an electroacoustic transducer comprising a first diaphragm and a driving component, wherein the first diaphragm is provided on a side of the driving component and is connected to the driving component;

a second diaphragm provided at a side of the driving component away from the first diaphragm, the second diaphragm being spaced apart from the electroacoustic transducer; and a housing structure configured to carry the electroacoustic transducer and the second diaphragm, wherein a space between a side of the second diaphragm close to the driving component and a side of the first diaphragm close to the driving component forms a first cavity with the housing structure, and a space between a side of the electroacoustic transducer close to the second diaphragm and the second diaphragm forms a second cavity with the housing structure; wherein in a working state, the driving component drives the first diaphragm to vibrate, the first diaphragm pushes an air spring sealed in the first cavity to vibrate and causes the second diaphragm to passively vibrate with the air spring, and a volume of the second cavity is not greater than ⅕ of an equivalent volume of the electroacoustic transducer.

2. The acoustic output apparatus according to claim 1, wherein a third cavity is formed between a side of the first diaphragm away from the driving component and the housing structure, the housing structure further comprises a first sound output hole, and first sound output hole is acoustically coupled with the third cavity; wherein, in a working state, the driving component drives the first diaphragm to vibrate and radiates a sound signal to the third cavity, the sound signal is exported to an exterior of the acoustic output apparatus through the first sound output hole.

3. The acoustic output apparatus according to claim 2, wherein part or entirety of an inner cavity face of the third cavity is a first curved face.

4. The acoustic output apparatus according to claim 1, wherein a side of the second diaphragm away from the electroacoustic transducer forms a fourth cavity with the housing structure, the housing structure further comprises a second sound output hole, and the second sound output hole is acoustically coupled with the fourth cavity; wherein, in a working state, the second diaphragm passively vibrates with the air spring and radiates a sound signal to the fourth cavity, and the sound signal is exported to an exterior of the acoustic output apparatus through the second sound output hole.

5. The acoustic output apparatus according to claim 4, wherein part or entirety of an inner cavity surface of the fourth cavity is a second curved face.

6. The acoustic output apparatus according to claim 1, further comprising:

a protective structure provided at a side of the second diaphragm away from the electroacoustic transducer, wherein the protective structure is configured to separate the second diaphragm from an exterior of the acoustic output apparatus and is capable of propagating a sound generated by the second diaphragm to the exterior of the acoustic output apparatus.

7. The acoustic output apparatus according to claim 1, wherein the second diaphragm comprises:

a diaphragm body, comprising a middle flat portion and a folded ring portion, which are connected to each other;

a flat central sticker adhered to a surface of the middle flat portion; wherein, the middle flat portion is provided with a first through hole.

8. The acoustic output apparatus according to claim 7, wherein the flat central sticker is provided with a second through hole communicated with the first through hole.

9. The acoustic output apparatus according to claim 8, wherein the second diaphragm further comprises at least one of a first blocking member and a second blocking member; wherein the first blocking member comprises a mesh structure and is connected to the diaphragm body, and the first blocking member is provided to match the first through hole so as to cover the first through hole;

the second blocking member comprises a mesh structure and is connected to the flat central sticker, and the second blocking member is provided to match the second through hole so as to cover the second through hole.

10. The acoustic output apparatus according to claim 1, wherein, along a direction in which the first diaphragm, the driving component and the second diaphragm are arranged, a distance between the second diaphragm and a side of the electroacoustic transducer close to the second diaphragm is not greater than 3 mm.

11. The acoustic output apparatus according to claim 1, wherein a projection portion where a first orthographic projection of the electroacoustic transducer on a first reference plane parallel to the first diaphragm overlaps a second orthographic projection of the second diaphragm on the first reference plane has a first area;

among the first and second orthographic projections, the one with a larger area has a second area, and a ratio of the first area to the second area is 0.7-1.

12. The acoustic output apparatus according to claim 1, wherein a ratio of an area of the second diaphragm to an area of the first diaphragm is not less than 1; and/or, a mass of the second diaphragm is less than a mass of the first diaphragm; and/or, a compliance of the second diaphragm is greater than a compliance of the first diaphragm.

13. The acoustic output apparatus according to claim 1, wherein the driving component comprises a voice coil, the first diaphragm is connected to the voice coil, and the first diaphragm and the voice coil form a first vibration system; and the second diaphragm forms a second vibration system; wherein, a ratio of a resonance frequency of the second vibration system to a resonance frequency of the first vibration system is not more than 0.7.

14. The acoustic output apparatus according to claim 13, wherein a ratio of a compliance of the second vibration system to a compliance of the first vibration system is not less than 1.5; and/or, a ratio of a mass of the second vibration system to a mass of the first vibration system is not more than 0.7.

15. An earphone, comprising an acoustic output apparatus, wherein the acoustic output apparatus comprising:

an electroacoustic transducer comprising a first diaphragm and a driving component, wherein the first diaphragm is provided on a side of the driving component and is connected to the driving component;

a second diaphragm provided at a side of the driving component away from the first diaphragm, the second diaphragm being spaced apart from the electroacoustic transducer; and a housing structure configured to carry the electroacoustic transducer and the second diaphragm, wherein a space between a side of the second diaphragm close to the driving component and a side of the first diaphragm close to the driving component forms a first cavity with the housing structure, and a space between a side of the electroacoustic transducer close to the second diaphragm and the second diaphragm forms a second cavity with the housing structure; wherein in a working state, the driving component drives the first diaphragm to vibrate, the first diaphragm pushes an air spring sealed in the first cavity to vibrate and causes the second diaphragm to passively vibrate with the air spring, and a volume of the second cavity is not greater than 1/5 of an equivalent volume of the electroacoustic transducer.

* * * * *